United States Patent
Meier et al.

(10) Patent No.: US 10,402,334 B1
(45) Date of Patent: *Sep. 3, 2019

(54) PREFETCH CIRCUIT FOR A PROCESSOR WITH POINTER OPTIMIZATION

(71) Applicant: Apple Inc., Cupertino, CA (US)

(72) Inventors: Stephan G. Meier, Los Altos, CA (US); Mridul Agarwal, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/948,072

(22) Filed: Apr. 9, 2018

Related U.S. Application Data

(63) Continuation of application No. 14/748,833, filed on Jun. 24, 2015, now Pat. No. 9,971,694.

(51) Int. Cl.
  *G06F 12/00* (2006.01)
  *G06F 12/0862* (2016.01)
  *G06F 9/30* (2018.01)

(52) U.S. Cl.
  CPC ...... *G06F 12/0862* (2013.01); *G06F 9/30043* (2013.01); *G06F 9/30047* (2013.01); *G06F 2212/602* (2013.01); *G06F 2212/6028* (2013.01)

(58) Field of Classification Search
  None
  See application file for complete search history.

(56) References Cited

U.S. PATENT DOCUMENTS

| | | | |
|---|---|---|---|
| 5,305,389 | A | 4/1994 | Palmer |
| 6,151,662 | A | 11/2000 | Christie et al. |
| 6,317,811 | B1 | 11/2001 | Deshpande et al. |
| 6,446,167 | B1 | 9/2002 | Mayfield et al. |

(Continued)

FOREIGN PATENT DOCUMENTS

| | | |
|---|---|---|
| EP | 0402787 | 12/1990 |
| TW | 486628 B | 5/2002 |

(Continued)

OTHER PUBLICATIONS

Yasuo Ishii et al., "Access Map Pattern Matching Prefetch: Optimization Friendly Method," NEC Corporation, University of Tokyo, 2009, pp. 1-5.

(Continued)

*Primary Examiner* — Midys Rojas
(74) *Attorney, Agent, or Firm* — Meyertons, Hood, Kivlin, Kowert & Goetzel, P.C.; Lawrence J. Merkel

(57) ABSTRACT

In an embodiment, a processor may implement an access map-pattern match (AMPM)-based prefetch circuit with features designed to improve prefetching accuracy and/or reduce power consumption. In an embodiment, the prefetch circuit may be configured to detect that pointer reads are occurring (e.g. "pointer chasing.") The prefetch circuit may be configured to increase the frequency at which prefetch requests are generated for an access map in which pointer read activity is detected, compared to the frequency at which the prefetch requests would be generated in the pointer read activity is not generated. In an embodiment, the prefetch circuit may also detect access maps that are store-only, and may reduce the frequency of prefetches for store only access maps as compared to the frequency of load-only or load/store maps.

20 Claims, 8 Drawing Sheets

(56) References Cited

U.S. PATENT DOCUMENTS

| | | | |
|---|---|---|---|
| 6,970,985 | B2 | 11/2005 | Moritz |
| 7,493,607 | B2 | 2/2009 | Moritz |
| 7,836,259 | B1 | 11/2010 | Filippo et al. |
| 7,975,108 | B1 | 7/2011 | Holscher et al. |
| 8,255,631 | B2 | 8/2012 | Chen et al. |
| 8,627,009 | B2 | 1/2014 | Mekhiel |
| 8,856,447 | B2 | 10/2014 | Williams, III |
| 8,856,451 | B2 | 10/2014 | Thompson et al. |
| 8,892,822 | B2 | 11/2014 | Chou |
| 8,924,651 | B2 | 12/2014 | Tang et al. |
| 9,015,422 | B2 | 4/2015 | Meier et al. |
| 9,886,385 | B1 | 2/2018 | Huberty et al. |
| 9,904,624 | B1 | 2/2018 | Huberty et al. |
| 9,971,694 | B1 | 5/2018 | Meier et al. |
| 10,180,905 | B1 | 1/2019 | Meier et al. |
| 2002/0069326 | A1 | 6/2002 | Richardson et al. |
| 2003/0079089 | A1 | 4/2003 | Barrick et al. |
| 2007/0088915 | A1 | 4/2007 | Archambault et al. |
| 2007/0288697 | A1 | 12/2007 | Keltcher |
| 2008/0016330 | A1 | 1/2008 | El-Essawy et al. |
| 2009/0199190 | A1 | 8/2009 | Chen et al. |
| 2009/0307691 | A1 | 12/2009 | Moscibroda et al. |
| 2010/0268892 | A1 | 10/2010 | Luttrell |
| 2011/0066811 | A1 | 3/2011 | Sander et al. |
| 2012/0159073 | A1 | 6/2012 | Jaleel et al. |
| 2013/0238861 | A1 | 9/2013 | Manne et al. |
| 2013/0254485 | A1 | 9/2013 | Kannan et al. |
| 2014/0108740 | A1 | 4/2014 | Rafacz et al. |
| 2014/0258641 | A1 | 9/2014 | Hooker et al. |
| 2016/0062768 | A1 | 3/2016 | Jagannathan |
| 2017/0371790 | A1 | 12/2017 | Dwiel et al. |

FOREIGN PATENT DOCUMENTS

| | | | |
|---|---|---|---|
| TW | 200821925 | A | 5/2008 |
| TW | 200901027 | A | 1/2009 |

OTHER PUBLICATIONS

Yasuo Ishii et al., "Access Map Pattern Matching for High Performance Data Cache Prefetch," Journal of Instruction-Level Parallelism 13 (2011) pp. 1-24.

Zhigang Hu, Margaret Martonosi, and Stefanos Kaxiras "TCP: Tag Correlating Prefetchers", Feb. 2003, Proceedings of the 9th International Symposium on High-Performance Computer Architecture (HPCA '03), pp. 1-10.

Fei Gao, Hanyu Cui, Suleyman Sair "Two-level Data Prefetching" 25th International Conference on Computer Design, 2007, pp. 1-8.

Harold W. Cain, Priya Nagpurkar, "Runahead Execution vs. Conventional Data Prefetching in the IBM POWER6 Microprocessor" International symposium on performance analysis of systems and software, 2010, pp. 1-10.

Office Action, U.S. Appl. No. 15/903,173, dated Aug. 11, 2017, 18 pages.

Yasuo Ishii, et al., "Access Map Pattern Matching Prefetch: Optimization Friendly Method",University of Tokyo, 2009, pp. 1-5.

Yasuo Ishii, et al., "Access Map Pattern Matching for High Performance Data Cache Prefetch", Tokyo, Japan, published Jan. 2001, pp. 1-24.

U.S. Appl. No. 15/093,173, filed Apr. 7, 2016, Huberty et al.

U.S. Appl. No. 15/093,213, filed Apr. 7, 2016, Meier et al.

U.S. Appl. No. 14/748,833, filed Jun. 24, 2015, Meier et al.

International Search Report and Written Opinion from PCT/US2014/042633, dated Oct. 9, 2014, Apple Inc., pp. 1-9.

Notice of Preliminary Rejection in Korean Patent Application No. 10-2013-29235, dated May 16, 2014, 6 pages.

International Search Report and Written Opinion in Application No. PCT/US2013/030497, dated May 7, 2013, pp. 1-13.

European Extended Search Report in application No. 13159754.4-1953 dated Jul. 26 2013 pp. 1-7.

Notice of Last Preliminary Rejection in Korean Patent Application No. 10-2013-29235, dated Oct. 30, 2014, 4 pages.

Office Action in Taiwan Patent Application No. 102109728, dated Oct. 14, 2014, 15 pages.

Jia et al, "An Improved AMPM-based Prefetcher Coupled with Configurable Cache Line Sizing," 2015, accessed (in Jul. 2018) from http://comparch-conf.gatech.edu/dpc2/resource/dpc2jia.pdf, 4 pages.

Mansi, "An Improved Hybrid AMPM and ISB Prefetcher," 2016, place of publication unknown, pp. 1-8.

Dimitrov et al, "Combining Local and Global History for High Performance Data Prefetching," Journal of Instruction-Level Parallelism 13 (2011), pp. 1-14.

Nesbit et al, "Data Cache Prefetching Using a Global History Buffer," published in 10th International Symposium on High Performance Computer Architecture (HPCA '04), Feb. 14-18, 2004, 10 pages.

U.S. Appl. No. 15/435,910, Stephan G. Meier, filed Feb. 17, 2017.

| Prefetch Circuit 20 Quality Factor ||
| State | Tokens |
| --- | --- |
| Initial Allocation | 75 |
| Maximum | 100 |
| Prefetch Generated | -8 |
| Store-only Prefetch Generated | -10 |
| Prefetch Consumed by Demand Access | +12 |
| Prefetch Hits in Data Cache 30 | -4 |

| Prefetch Circuit 36 Quality Factor ||
| State | Tokens |
| --- | --- |
| Initial Allocation | 32 |
| Maximum | 100 |
| Prefetch Generated | -4 |
| Store-only Prefetch Generated | -6 |
| Prefetch Consumed by Demand Access | +8 |
| Prefetch Received with Pointer Bit | +12 |

|           | AP |       |                                     |
|-----------|----|-------|-------------------------------------|
| A A│A│P P |    |       | Unit Stride, Forward                |
| A . A .│A│. P . P |  | | Non-unit, Regular Stride, Forward   |
| 148 —— P P│A│A A |  |   | Unit Stride, Backward               |
| A * *│A│P |    |       | Wildcards                           |
| A A . . A .│A│P P . P P | | | Irregular Pattern, Forward       |
| A . A A A .│A│. P P |  | | Irregular Pattern, Forward          |

Fig. 9

|         | AP |                      |
|---------|----|----------------------|
| A . . *│A│P | | Wildcard Pattern     |
| A . . A│A│   | | Matching Access Map 1 |
| A . . S│A│   | | Matching Access Map 2 |
| A . . P│A│   | | Matching Access Map 3 |
| A . . .│A│   | | Matching Access Map 4 |

Fig. 10

PREFETCH CIRCUIT FOR A PROCESSOR WITH POINTER OPTIMIZATION

This application is a continuation of U.S. patent application Ser. No. 14/748,833, filed on Jun. 24, 2015 and now U.S. Pat. No. 9,971,694. The above application is incorporated herein by reference in its entirety.

BACKGROUND

Technical Field

Embodiments described herein are related to prefetch mechanisms in processors.

Description of the Related Art

Processors continue to be produced with both higher operating frequencies and higher average number of instructions executed per clock cycle (IPC). Memory latency, on the other hand, has only decreased at a much slower rate. Accordingly, processors are often stalled awaiting instructions and/or data from memory. In order to improve performance, processors typically include one or more levels of caching. Data stored in the cache may be available at a much lower latency than data from memory. Accordingly, cache hits may be provided with low latency and may improve performance of the processors. Cache misses are fetched from memory and incur the higher memory latencies.

In an attempt to reduce the effective memory latency even further, processors can implement prefetching. Generally, prefetching involves predicting which cache blocks the processor will need to access soon, and initiating the memory read for the cache blocks prior to such accesses being generated via instruction code execution in the processor. If the prefetching successfully reads cache blocks that are later accessed by the processor, memory latency is reduced because the accesses are cache hits instead of cache misses. On the other hand, inaccurate prefetching can cause useful data to be removed from the cache. Since the inaccurately prefetched data is not accessed, performance is reduced. Additionally, even if performance is not adversely affected or improved by a small amount, excess power consumed by the processor to perform the prefetching might not be justified. Particularly, in portable devices in which the available energy is limited (e.g. from a battery), the excess power consumption can reduce battery life.

SUMMARY

In an embodiment, a processor may implement an access map-pattern match (AMPM)-based prefetch circuit with features designed to improve prefetching accuracy and/or reduce power consumption. In an embodiment, the prefetch circuit may be configured to detect that pointer reads are occurring (e.g. where a result of one load memory operation is used as a source operand of another load memory operation, or "pointer chasing.") Pointer reads may indicate that the prefetching is actually more successful than it appears to be, at least for certain workloads. The prefetch circuit may be configured to increase the frequency at which prefetch requests are generated for an access map in which pointer read activity is detected, compared to the frequency at which the prefetch requests would be generated if the pointer read activity is not detected. In an embodiment, the prefetch circuit may also detect access maps that are store-only, and may reduce the frequency of prefetches for store only access maps as compared to the frequency of load-only or load/store maps.

BRIEF DESCRIPTION OF THE DRAWINGS

The following detailed description makes reference to the accompanying drawings, which are now briefly described.

FIG. 7 is a table illustrating one embodiment of quality factor updates for the prefetch circuit shown in FIG. 2.

FIG. 8 is a table illustrating one embodiment of quality factor updates for the prefetch circuit within the external cache shown in FIG. 1.

FIG. 9 is a diagram illustrating exemplary patterns to be matched.

FIG. 10 is a diagram illustrating a pattern including a wild card and the matching patterns.

Figure 1:
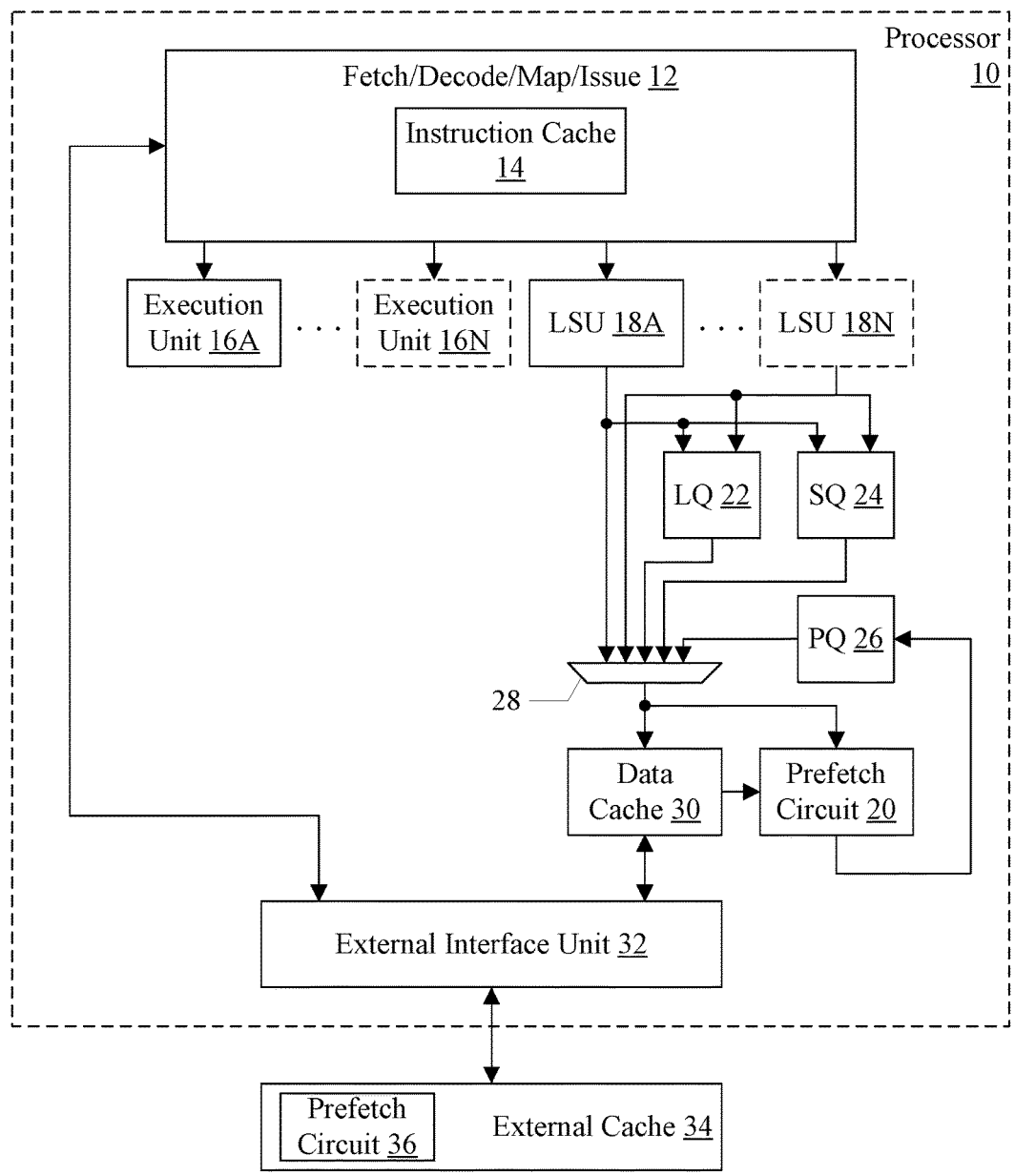
FIG. 1 is a block diagram of one embodiment of a processor.

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112(f) interpretation for that unit/circuit/component.

This specification includes references to "one embodiment" or "an embodiment." The appearances of the phrases "in one embodiment" or "in an embodiment" do not necessarily refer to the same embodiment, although embodiments that include any combination of the features are generally contemplated, unless expressly disclaimed herein. Particular features, structures, or characteristics may be combined in any suitable manner consistent with this disclosure.

DETAILED DESCRIPTION OF EMBODIMENTS

Processor Overview

Turning now to FIG. 1, a block diagram of one embodiment of a processor 10 and an external (to the processor 10) cache 34 is shown. In the embodiment of FIG. 1, the processor 10 may include a fetch/decode/map/issue (FDMI) unit 12 that may include an instruction cache 14. The processor 10 may further include one or more execution units 16A-16N, one or more load/store units (LSUs) 18A-18N, a prefetch circuit 20, a load queue (LQ) 22, a store queue (SQ) 24, a prefetch queue (PQ) 26, a multiplexor (mux) 28, a data cache 30, and an external interface unit 32. The data cache 30 and the FDMI unit 12 are coupled to the external interface unit 32, which is coupled to communicate external to the processor 10 (e.g. to the external cache 34 and/or to other components of a system including the processor 10). The FDMI unit 12 is coupled to the execution units 16A-16N and the LSUs 18A-18N. The LSUs 18A-18N are coupled to the load queue 22 and the store queue 24, and the prefetch circuit 20 is coupled to the data cache 30 and the prefetch queue 26. The LSUs 18A-18N, the load queue 22, the store queue 24, and the prefetch queue 26 are coupled to the mux 28, which is coupled to the data cache 30 and the prefetch circuit 20. In the illustrated embodiment, the external cache 34 includes a prefetch circuit 36.

The FDMI unit 12 may be configured to fetch instructions for execution by the processor 10, decode the instructions into ops for execution, map the ops to speculative resources (e.g. rename registers) to permit out-of-order and/or speculative execution, and issue the ops for execution to the execution units 16A-16N and/or LSUs 18A-18N. More particularly, the FDMI unit 12 may be configured to cache instructions previously fetched from memory (through the external interface unit 32) in the instruction cache 14, and may be configured to fetch a speculative path of instructions for the processor 10. The FDMI unit 12 may implement various prediction structures to predict the fetch path. For example, a next fetch predictor may be used to predict fetch addresses based on previously executed instructions. Branch predictors of various types may be used to verify the next fetch prediction, or may be used to predict next fetch addresses if the next fetch predictor is not used. The FDMI unit 12 may be configured to decode the instructions into instruction operations. In some embodiments, a given instruction may be decoded into one or more instruction operations, depending on the complexity of the instruction. Particularly complex instructions may be microcoded, in some embodiments. In such embodiments, the microcode routine for the instruction may be coded in instruction operations. In other embodiments, each instruction in the instruction set architecture implemented by the processor 10 may be decoded into a single instruction operation, and thus the instruction operation may be essentially synonymous with instruction (although it may be modified in form by the decoder). The term "instruction operation" may be more briefly referred to herein as "op." The ops may be mapped to physical registers from the architectural registers used in the instructions, and then scheduled for issue. The scheduling may be centralized in a scheduler, or decentralized in reservation stations, in various embodiments, based on the availability of operands for each op. A register file or files (not shown in FIG. 1) may implement the physical registers of the processor 10. There may be separate physical registers for different operand types (e.g. integer, media, floating point, etc.) in an embodiment. In other embodiments, the physical registers may be shared over operand types.

The execution units 16A-16N may include any types of execution units in various embodiments. For example the execution units 16A-16N may include integer, floating point, and/or media execution units. Integer execution units may be configured to execute integer ops. Generally, an integer op is an op which performs a defined operation (e.g. arithmetic, logical, shift/rotate, etc.) on integer operands. Integers may be numeric values in which each value corresponds to a mathematical integer. The integer execution units may include branch processing hardware to process branch ops, or there may be separate branch execution units.

Floating point execution units may be configured to execute floating point ops. Generally, floating point ops may be ops that have been defined to operate on floating point operands. A floating point operand is an operand that is represented as a base raised to an exponent power and multiplied by a mantissa (or significand). The exponent, the sign of the operand, and the mantissa/significand may be represented explicitly in the operand and the base may be implicit (e.g. base 2, in an embodiment).

Media execution units may be configured to execute media ops. Media ops may be ops that have been defined to process media data (e.g. image data such as pixels, audio data, etc.). Media processing may be characterized by performing the same processing on significant amounts of data, where each datum is a relatively small value (e.g. 8 bits, or 16 bits, compared to 32 bits to 64 bits for an integer). Thus, media ops often include single instruction-multiple data (SIMD) or vector operations on an operand that represents multiple media data.

Thus, each execution unit may comprise hardware configured to perform the operations defined for the ops that the particular execution unit is defined to handle. The execution units may generally be independent of each other, in the sense that each execution unit may be configured to operate on an op that was issued to that execution unit without dependence on other execution units. Viewed in another way, each execution unit may be an independent pipe for executing ops.

The LSUs 18A-18N may be configured to execute load/store memory ops.

Generically, a memory operation (memory op) may be an instruction operation that specifies an access to memory (although the memory access may be completed in a cache such as the data cache 30 or the external cache 34). Generally, a load memory operation may specify a transfer of data from a memory location to a register, while a store memory operation may specify a transfer of data from a register to a memory location. Load memory operations may be referred to as load memory ops, load ops, or loads; and store memory operations may be referred to as store memory ops, store ops, or stores. The LSUs 18A-18N may be configured to perform virtual address generation from various address operands of the load/store ops and may be configured to transmit the ops to the data cache 30 (through the mux 28) and to the load queue 22/store queue 24.

The load queue 22 may be configured to queue load ops that have been executed by the LSUs 18A-18N. The load ops may be queued awaiting cache fills if they miss in the data cache 30 (and/or TLB miss translation fills if translation is enabled). The load ops may be queued for ordering reasons as well. Similarly, the store queue 24 may be configured to queue store ops that have been executed by the LSUs 18A-18N. The store ops may be queue for cache/TLB fills, to await store data from the data source operand, and/or to await non-speculative/retired state to update the data cache 30 and/or memory. In other embodiments, a combined load/store queue may be used.

The prefetch queue 26 may store prefetch requests generated by the prefetch circuit 20 to access the data cache 30. The prefetch requests may be generated by the prefetch circuit 20 observing the load/store ops executed by the LSUs 18A-18N. Thus, the prefetch requests may be predicted read requests generated prior to the instruction code being executed by the processor 10 actually requesting the data. In contrast, cache requests by load/store ops may be referred to as demand fetches, because they are directly specified by the execution of code, rather than predicted.

In an embodiment, the prefetch circuit 20 may be an implementation of an AMPM prefetcher with various enhancements. The AMPM prefetcher is described in more detail below. The prefetch circuit 20 may monitor the demand fetches/prefetch requests selected through the mux 28 to access the data cache 30, along with cache hit/miss status from the data cache 30, to generate prefetch requests.

The data cache 30 may have any capacity and configuration. For example, set associative, fully associative, and direct mapped configurations may be used in various embodiments. The data cache 30 may be configured to cache data in cache blocks, where a cache block is a set of bytes from contiguous memory locations that are allocated and deallocated space in the cache as a unit. The cache blocks may be aligned to a cache block boundary (e.g. a 32 byte cache block may be aligned to a 32 byte boundary, a 64 byte cache block may be aligned to a 64 byte boundary, a 128 byte cache block may be aligned to a 128 byte boundary, etc.). Thus, the address of a byte may be divided into a cache offset portion (the least N significant bits of the address, where $2^N$ is the size of the cache block) and a cache tag portion (the remaining address bits). In an embodiment, the data cache 30 may be virtually indexed and a translation lookaside buffer (TLB, not shown in FIG. 1) may be accessed in parallel to translate the virtual address to a physical address of a memory location in the memory.

Cache misses in data cache 30 and instruction cache 14, as well as translation accesses, non-cacheable accesses, etc. may be communicated to the external interface unit 32. The external interface unit 32 may be configured to transmit transactions to the external cache 34 in response to the various accesses generated in the processor 10. The external interface on which transactions are transmitted may have any form. For example, the external interface may be a shared bus, a point to point interconnect with packetized transactions, a full or partial crossbar, etc.

The external cache 34 may have any capacity and configuration as well. In an embodiment, the external cache 34 may be a level 2 (L2) cache. In another embodiment, the processor 10 may include an L2 cache and the external cache 34 may be a level 3 (L3) cache. The external cache 34 may be any level of cache in a memory hierarchy. The external cache 34 may be inclusive of the data cache 30, non-inclusive of the data cache 30, or exclusive of the data cache 30, in various embodiments. The cache block size in the external cache 34 may be the same size as the cache block size of the data cache 30, or may be a different cache block size (e.g. a larger cache block size).

The prefetch circuit 36 may be configured to generate prefetch requests for the external cache 34. The prefetch requests from the prefetch circuit 36 may be passed through the external cache 34 and, assuming a miss, may be transmitted to lower level caches and/or a main memory in a system including the processor 10. In an embodiment, the prefetch circuit 36 may be a slave to the prefetch circuit 20. That is, the prefetch circuit 20 may transmit the access map and prefetch pattern to the prefetch circuit 36 as part of a generated prefetch request. The prefetch circuit 36 may capture the prefetch information and may generate and track prefetch requests using the prefetch information. The prefetch circuit 36 may "prefetch ahead" of the prefetch circuit 20, prefetching cache blocks into the external cache 34 in anticipation of prefetch requests from the prefetch circuit 20 and/or demand accesses from the processor 10 to read the prefetched data from the external cache 34 to the data cache 30.

The mux 28 may select among its various inputs (the LSUs 18A-18N, the load queue 22, the store queue 24, and the prefetch queue 26) to transmit cache accesses to the data cache 30. Control logic to the mux 28 (not shown in FIG. 1) may arbitrate among the requests using any desired arbitration scheme. The mux 28 may select multiple inputs to access the data cache 30 (and the prefetch circuit 20) concurrently (e.g. up to one per data cache port). In an embodiment, the data cache 30 may include two read ports and two write ports, for example, supporting up to two load ops (and/or store ops performing a hit check) and two store ops per clock cycle. More or fewer ports may be supported It is noted that any number and type of execution units 16A-16N may be included in various embodiments, including embodiments having one execution unit and embodiments having multiple execution units. Any number of LSUs 18A-18N may be included in various embodiments as well, including one LSU and multiple LSUs. Additionally embodiments that include load units (that execute only load ops) and/or store units (that execute only store ops) may be included with or without LSUs.

Prefetch Circuit

Figure 2:
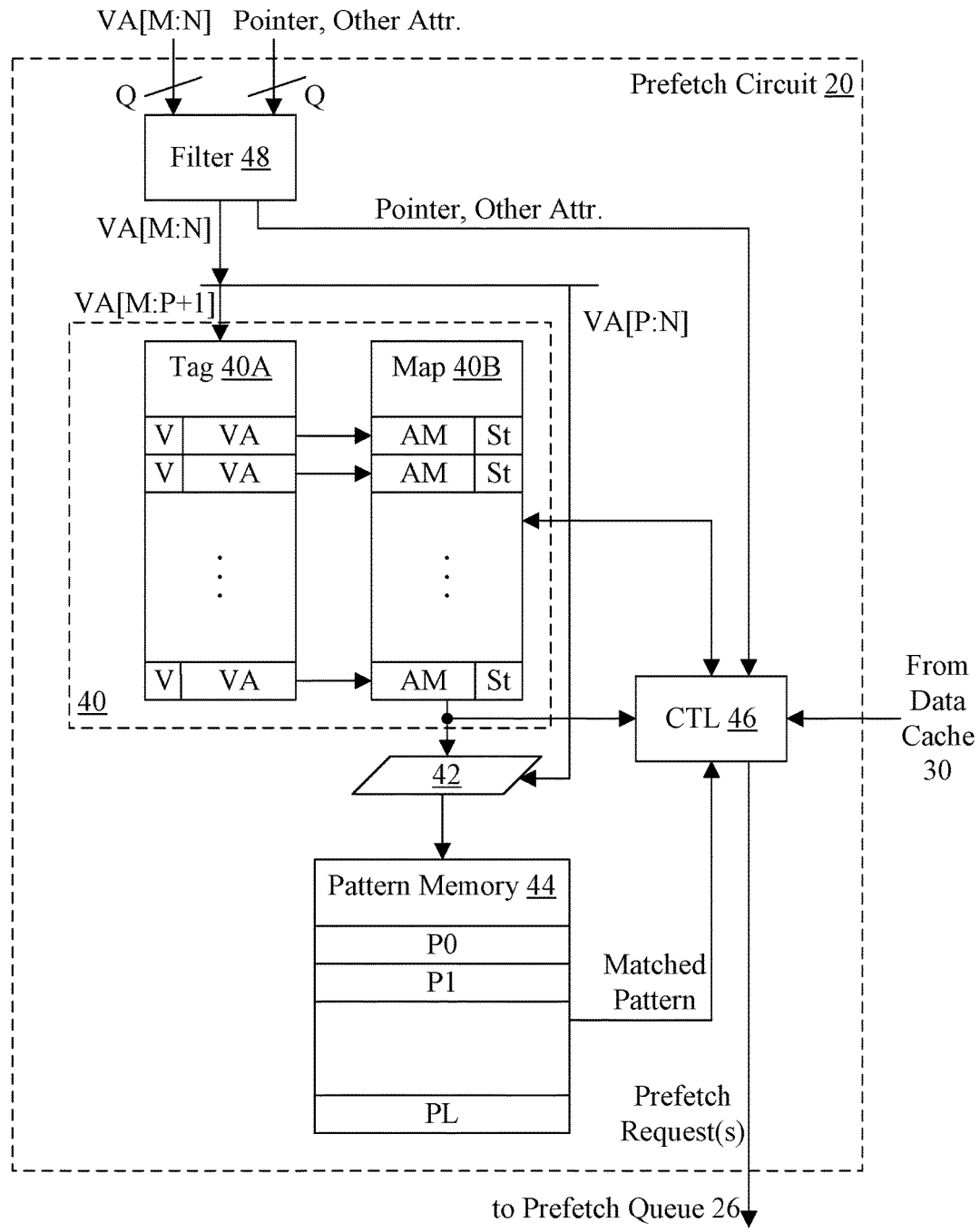
FIG. 2 is a block diagram of one embodiment of a prefetch circuit shown in FIG. 1.

Turning now to FIG. 2, a block diagram of one embodiment of the prefetch circuit 20 is shown. In the illustrated embodiment, the prefetch circuit 20 includes an access map memory 40, a shifter 42, an access pattern memory 44, a control circuit 46, and an input filter buffer 48.

The filter buffer 48 may receive Q concurrent memory operations from the LSUs 18A-18N, through the mux 28. Q may be an integer greater than 1 (e.g. 4, in the above example in which the data cache has 4 ports). The filter buffer 48 may capture information from the operations for presentation to the access map memory 40 and the control circuit 46. The filter buffer 48 may be configured to merge multiple memory operations to the same access map and present the operations to the access map memory 40, the shifter 42, and the control circuit 46. In the illustrated embodiment, the filter buffer 48 may be configured to present one operation per clock cycle, although other embodiments may be configured to present more operations in parallel, but less than Q operations. The size and complexity of the memory structures and circuitry in the prefetch circuit 20 to support concurrent operations may be reduced through use of the filter buffer 48.

The filter buffer 48 may capture the virtual address (or a portion thereof) from each memory operation as well as various other attributes that may be used by the prefetch circuit 20. For example, in the illustrated embodiment, the prefetch circuit 20 may receive a pointer indication indicating whether or not the memory operation is a pointer read. Pointer reads may be detected in the LSUs 18A-18N. For example, a pointer read may be inferred if the target register of a load op is a source register of another load op. That is, the result of a load is consumed by another load. At least one of the source registers of a load op are used to form the virtual address accessed by the load op, and thus a load that consumes the result of a load may be using the result of the load to form an address. Accordingly, the loads may be part of a sequence of loads that is "pointer chasing:" reading addresses from memory locations and using those addresses to read other addresses. Such patterns may be benefit from prefetching, even if relatively few memory operations are performed to each prefetched cache block. That is, pointer reads may often be irregular accesses, and thus their access map matches may be appear to be low quality (e.g. see the discussion of quality factor below). When the access maps are hit by pointer reads, however, they may be more valuable than other hits because the latency of chasing the pointers in the absence of prefetches may otherwise be fully exposed to the executing code. Accordingly, the combination of the knowledge that certain reads are pointer reads and that the pointer reads hit on access maps may be an indication that a prefetch may be warranted for those access maps. Other attributes may be captured as well (e.g. whether the memory operation is a load or store op, type of load or store op, etc.).

The access map memory 40 and the shifter 42 are coupled to receive the virtual address of an access launched from the filter buffer 48 (or portions of the virtual address, as shown in FIG. 2), and the output of the access map memory 40 is coupled to the shifter 42. The control circuit 46 is coupled to the access map memory 40, to the access pattern memory 46, to provide prefetch requests to the prefetch queue 26, and to receive cache hit/miss information from the data cache 30. The shifter 42 is coupled to the access pattern memory 44. In the illustrated embodiment, the access map memory 40 includes a tag memory 40A and a map memory 40B.

The prefetch circuit 20 may be an implementation of an AMPM prefetcher. The access map memory 40 may store multiple access maps covering various access regions in the virtual address space. The access maps may represent the accesses to the cache blocks in the respective access regions. When another access hits on an access map in the access map memory 40, the access map may be output and compared to various access patterns stored in the access pattern memory 44. If a match between a given access pattern and the access map is detected, prefetch requests indicated by the matching pattern may be generated. The access patterns may be determined from trace analysis performed on various code sequences expected to be executed by the processor 10 during use. Given a certain pattern of demand accesses and/or successful prefetches, for example, one or more prefetches may be predicted based on the trace analysis. The access patterns may be identified during design of the processor 10 and hardcoded into the access pattern memory 44. Alternatively, some or all of the access patterns may be programmable in the access pattern memory 44 and may be written to the access pattern memory 44 during initialization of the processor 10 (e.g. at reset) or at some other convenient time.

As mentioned above, the access map 40 may store multiple access maps covering various access regions in the virtual address space. The access region may be a region of the virtual address space that includes multiple contiguous cache blocks. The access region may be aligned to a boundary determined by the size of the access region. For example, if access regions cover 2 kilobytes (kB) each, then the access regions are aligned to 2 kB boundaries. The access regions may be any desired size. For example, 4 kB access regions may be defined. Generally, an access map may be a record of various cache accesses that have occurred to the cache blocks within the access region. Each cache block within the access region may have an associated symbol in the access map, indicating the type of access that has occurred. In one embodiment, accesses may include demand-accessed (symbol A), prefetched (symbol P), successful prefetch (symbol S), or invalid (symbol "."). Each symbol may be represented by a different code of a value stored for the cache block in the access map. Thus, two bits per cache block may be stored based on the above symbols.

A demand-accessed cache block may be a cache block that was accessed without having been prefetched in advance. Thus, a load or store to the cache block may have been executed, and may have missed in the data cache 30. A prefetched cache block may be a cache block that was predicted to be accessed by the prefetch circuit 20, which generated a prefetch request that passed through the prefetch queue 26 and was presented to the data cache 30. Alternatively, the prefetched cache block may have had a prefetch request generated and inserted into the prefetch queue 26, but may or may not have been presented to the data cache 30. A successfully prefetched cache block may be a cache block that was prefetched, and was subsequently demand-accessed in the data cache 30 (and thus the demand access hit in the data cache 30). A successfully prefetched cache block may thus be an accurately prefetched cache block, since it was accessed. An invalid cache block in the access map may be a cache block that has not been accessed.

Accordingly, the virtual address (VA) of the data cache access (not including the N least significant bits of the address, bits N-1:0, where $2^N$ is the size of a cache block) may be input to the prefetch circuit 20. The least significant P-N bits of the virtual address provided to the prefetch circuit 20 may be an offset within the access map to the cache block being accessed. Thus, the access maps may cover $2^{P+1}$ bytes. The remainder of the virtual address, bits M:P+1, may be a tag that may be compared to the tags in the tag memory 40A.

The tag memory 40A may include multiple entries, each entry storing a tag for a corresponding access map in the map memory 40B. In an embodiment, the access map memory 40 may be fully associative and thus the tag memory 40A may be content addressable memory (CAM). If a match is detected between the VA tag input to the access map memory 40 and an entry in the CAM 40A (and the valid bit is set), a hit is detected on the entry. A corresponding entry in the map memory 40B (e.g. a random access memory, or RAM) may be output by the access map memory 40 to the shifter 42. Each entry in the map RAM 40B may include the access map (symbols for each cache block in the access region, labeled AM in FIG. 2) and may optionally include state associated with the access map (labeled St in FIG. 2). Exemplary state for various embodiments will be described in more detail below.

The access patterns in the access pattern memory 44 may be centered on an access point, which may be in approximately the center of the access pattern. That is, the access point may be one position to the right or the left of the exact middle of the access pattern, since the access pattern may be an even number of symbols long and the exact middle is between the two symbols. If the access pattern is an odd number of symbols, the access point may be the center of the pattern. By placing the access point in the center, the patterns may permit both forward and reverse patterns of accesses to be detected. A forward pattern may be progressing at increasingly larger offsets within the access map (viewing the access map offset as a number), whereas a reverse pattern may be progressing at decreasingly smaller offsets. Furthermore, matches to symbols on both sides of the access point may be permitted to capture unusual access patterns.

Accordingly, based on the access map offset of the input VA, the shifter 42 may shift the access map to align the current access point of the access map to the access point in the pattern memory 44. The shifted access pattern may be provided to the access pattern memory 44, which may compare the shifted access pattern to the patterns. The access pattern memory 44 may thus be a read-only memory (ROM) with comparison circuitry, a CAM, or a combination of ROM and CAM if some access patterns are hardcoded and others are programmable. If a pattern is matched, the matched pattern may be output by the access pattern memory 44 to the control circuit 46. The control circuit 46 may be configured to generate one or more prefetch requests based on the matched pattern and may transmit the prefetch requests to the prefetch queue 26. In the illustrated embodiment, the access pattern memory 44 may include L+1 entries, storing L+1 access patterns labeled P0 to PL in FIG. 2. In an embodiment, the generated prefetch requests may include a pointer indication indicating whether or not pointer read activity in the access map has been observed and should be included in determining prefetches. In an embodiment, the access map and/or the matched pattern may be provided with the prefetch request as well, for the prefetch circuit 36.

A given access map may match more than one pattern in the pattern memory 44. Longer patterns (patterns having the most demand-accessed and/or successfully prefetched cache blocks) may be more likely to generate accurate prefetches. In an embodiment, the patterns in the pattern memory 44 may be sorted so that the longer patterns are nearest one end of the memory (e.g. the "top", where pattern P0 is stored, or the "bottom", where pattern PL is stored). The pattern memory 44 may include a priority encoder that selects the match nearest the top, or nearest the bottom, if there is more than one match. In this manner, the longest pattern that is matched may be naturally selected from the pattern memory 44 and provided to the control circuit 46.

In addition to generating the prefetch requests, the control circuit 46 may be configured to update the hitting access map in the access map memory 40. The update may, in some cases, be affected by the cache hit/miss result and thus the cache hit/miss from the data cache 30 may be received by the control circuit 46. In the event of a miss on the access map memory 40, the prefetch circuit 20 may allocate an access map entry to the virtual address and may begin tracking the access map in the allocated entry.

Figure 3:
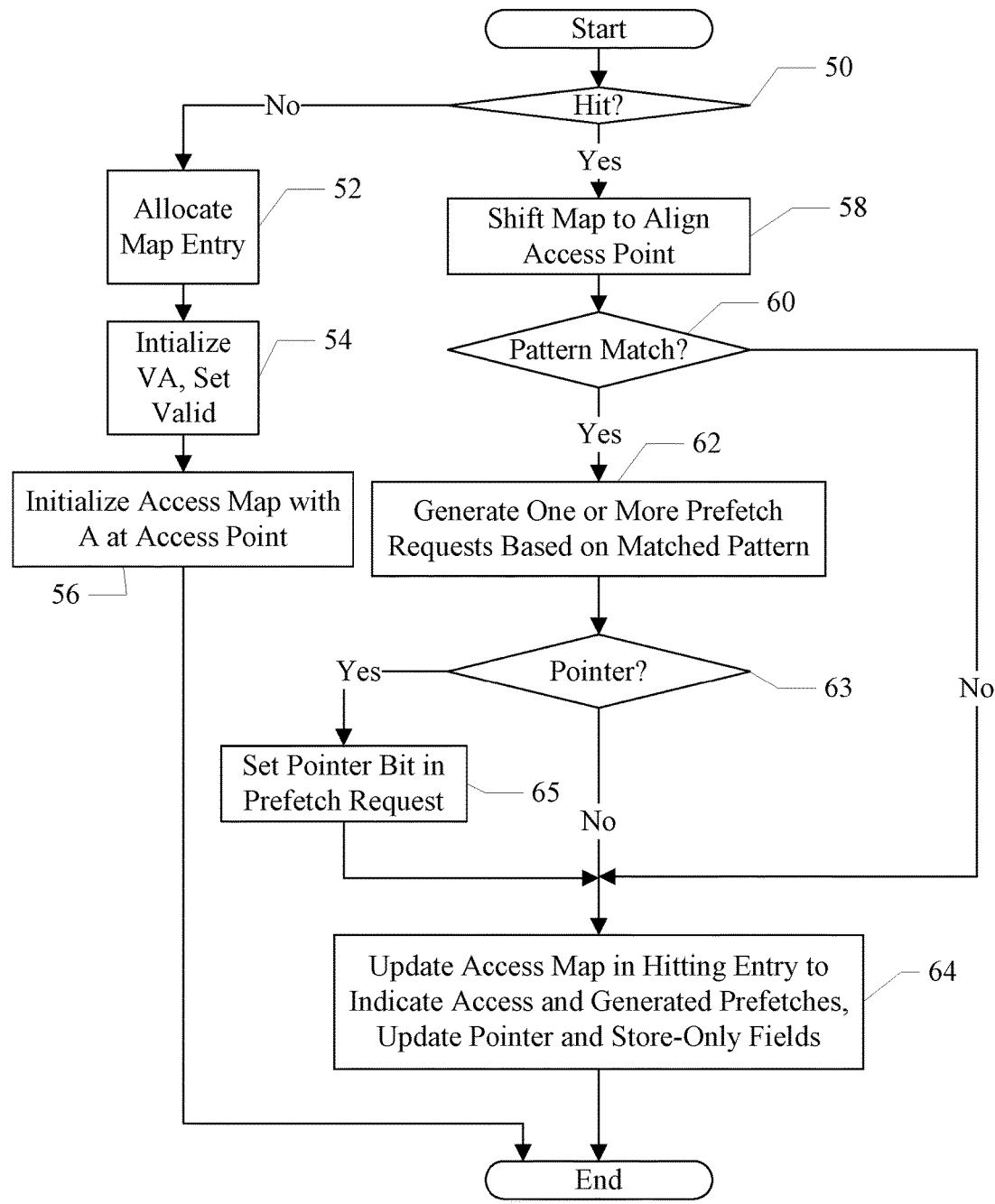
FIG. 3 is a flowchart illustrating operation of one embodiment of the prefetch circuit shown in FIG. 2.

Turning next to FIG. 3, a flowchart is shown illustrating operation of one embodiment of the prefetch circuit 20, and more particularly the control circuit 46, in response to a virtual address received by the prefetch circuit 20 (in parallel with the address accessing the data cache 30) and output by the filter buffer 48. While the blocks are shown in a particular order for ease of understanding, other orders may be used. Blocks may be performed in parallel in combinatorial logic in the prefetch circuit 20/control circuit 46. Blocks, combinations of blocks, and/or the flowchart as a whole may be pipelined over multiple clock cycles. The prefetch circuit 20/control circuit 46 may be configured to implement the operation shown in FIG. 3.

The virtual address (or the access map tag portion of the address) may be presented to the access map memory 40. If the virtual address is a miss in the access map memory 40 (decision block 50, "no" leg), the control circuit 46 may be configured to allocate an entry in the access map memory 40 for the access region containing the virtual address (block 52). Any sort of allocation scheme may be used. For example, the control circuit 46 may maintain least recently used (LRU) data over the access map entries, and may replace the LRU entry if there are no invalid entries to be allocated. Various pseudo-LRU schemes may be used, or a random replacement may be used. The control circuit 46 may initialize the tag portion of the allocated entry (in the tag CAM 40A) with the virtual address of the access region (e.g. bits M:P+1 of the VA) and may set the valid bit (block 54). Additionally, the control circuit may initialize the access map portion of the entry (in the map RAM 40B) with a clear access map (e.g. all invalid) except for an A at the access point indicated by the access map offset (bits P:N of the VA) (block 56). The state field associated with the access map may also be initialized, if included.

For example, if the pointer indication for the entry is set, the control circuit 46 may initialize the pointer field. In one embodiment, the pointer field may be a saturating counter field, and it may be initialized to zero if the pointer indication is clear and incremented from zero if the pointer indication is set. In an embodiment, increments due to the pointer indication being set may be larger than decrements when the pointer indication is clear. For example, an increment of 4 and a decrement of 1 may be implemented in an embodiment. The increments may saturate at the maximum value that is representable in the counter and the decrements may saturate at the minimum value that is representable in the counter. In an embodiment, a store-only field may be implemented to detect access maps that experience only store ops. If the memory op that caused the allocation is a store, the store-only field may be initialized to indicate store-only (e.g. set). If the memory op that cause the allocation is a load, the store-only field may be initialized to indicate not store-only (e.g. clear). Once the store-only field is cleared, it may not be set again until the entry is allocated to a new access region. In embodiments that implement a quality factor (QF) for each access map, the quality factor field may be initialized as well. Store-only access maps may be identified so that prefetching may be made less aggressive for the store-only access maps, in one embodiment. Processor performance may be less sensitive to the latency of stores, since the data is being written to memory rather than a register which may be an operand of a subsequent instruction. Various buffering for stores may allow the stores to appear to be complete from the processor's point of view. Thus, prefetching for store-only access maps may be de-emphasized compared to access maps that include loads or other reads.

If the virtual address is a hit in the access map memory 40 (decision block 50, "yes" leg), the access map memory 40 may output the corresponding access map to the shifter 42. The shifter 42 may shift the access map to align the access point (the offset to the accessed cache block in the access region—block 58). The shifted pattern output by the shifter 42 may be compared to the access patterns in the access pattern memory 44. If there is a match on a pattern (decision block 60, "yes" leg), the control circuit 42 may be configured to generate one or more prefetch requests based on the Ps in the matched pattern and further based on any previously generated prefetches recorded in the access map (block 62). That is, a previously generated or issued prefetch may not be generated again.

The control circuit 46 may analyze the pointer field from the access map entry and determine if pointer read activity is indicated for the access region (decision block 63). For example, the value of the pointer field may be compared to a fixed or programmable threshold. In an embodiment, the pointer read activity may be detected if the pointer field is greater than zero. If pointer read activity is detected (decision block 63, "yes" leg), the pointer indication (e.g. the pointer bit) may be set in the prefetch request (block 65). Otherwise the pointer indication may be clear.

The prefetch requests may also carry access map information (e.g. a copy of the access map, including potential prefetches from the matched pattern, or including the entire matched pattern). The prefetch circuit 36 may use the access map information to track and generate prefetches as desired. The access map information may be transmitted to the prefetch queue 26, and may be forwarded to the external interface unit in the case that the prefetch request is a miss in the data cache 30 (as expected).

The control circuit 46 may also update the access map in the hitting entry of the access map memory 40, independent of whether the access map matches a pattern in the access pattern memory 44 (block 64). In the present embodiment, the control circuit 42 may update the access map to indicate the current access as well as any generated prefetch requests. If the access map has an invalid symbol (".") at the access point and the access is a demand access, the "A" symbol may be inserted at the access point. If the access map has a prefetch symbol ("P") at the access point and the access is a demand access that hits in the data cache 30, the "S" symbol may be inserted at the access point. If the access map has an invalid symbol (".") at the access point and the access is a prefetch request, the "P" symbol may be inserted at the access point. The generated prefetches may be indicated at their respective points in the access map. In another embodiment, only the present access may be recorded in the access map, and prefetch requests may be recorded when subsequently presented to the data cache 30. Additionally, the store-only and pointer fields may be updated. The pointer field may be incremented if the op's pointer indication is set, or decremented if the op's pointer indication is clear. The store-only field may be cleared if the op is a load. A discussion of the various symbols and examples of their use for an embodiment is provided below with respect to FIGS. 9 and 10.

In some embodiments, the prefetch circuit 20 may support chained entries to manage a large stream of accesses. A stream of accesses may be a series of related accesses (e.g. generated from the same executing thread, such as a loop in the code) that is accessing data over a large memory foot print (e.g. two or more access map regions). Frequently, a stream may step through the footprint accessing the data, but may not return to previously visited data very often. If a stream spreads over multiple access regions, the stream may occupy multiple entries in the access map memory 40, potentially dislodging other useful access maps. Chained entries may be used to more efficiently handle streams in the access map memory 40, accurately prefetching for the streams while also maintaining potentially many other access maps. In an embodiment, a stream may be detected according to a stream threshold, which may be compared to an access map length. The stream threshold may be fixed or programmable. An access map length may refer to at least a number of demand-accessed cache blocks in an access map (i.e. "A" symbols), and may in some cases further include successful prefetches as well (i.e. "S" symbols). Similarly, a pattern length of an access pattern in the access pattern memory 44 may refer to at least a number of demand-accessed cache blocks in an access map (i.e. "A" symbols), and may in some cases further include successful prefetches as well (i.e. "S" symbols).

Once the prefetch circuit 20 identifies a stream, the prefetch circuit may allocate a chained entry to the stream. The chained entry may include at least a pair of entries, and may include more than a pair if desired to retain sufficient stream history. The pair of chained entries may be used to track the access map, and may be reused as the stream progresses across access regions instead of allocating new access map entries to track the stream. In this manner, the consumption of access map entries by a stream may be limited and the displacement of unrelated access maps from the access map memory 40 may similarly be limited.

Figures 4, 5:
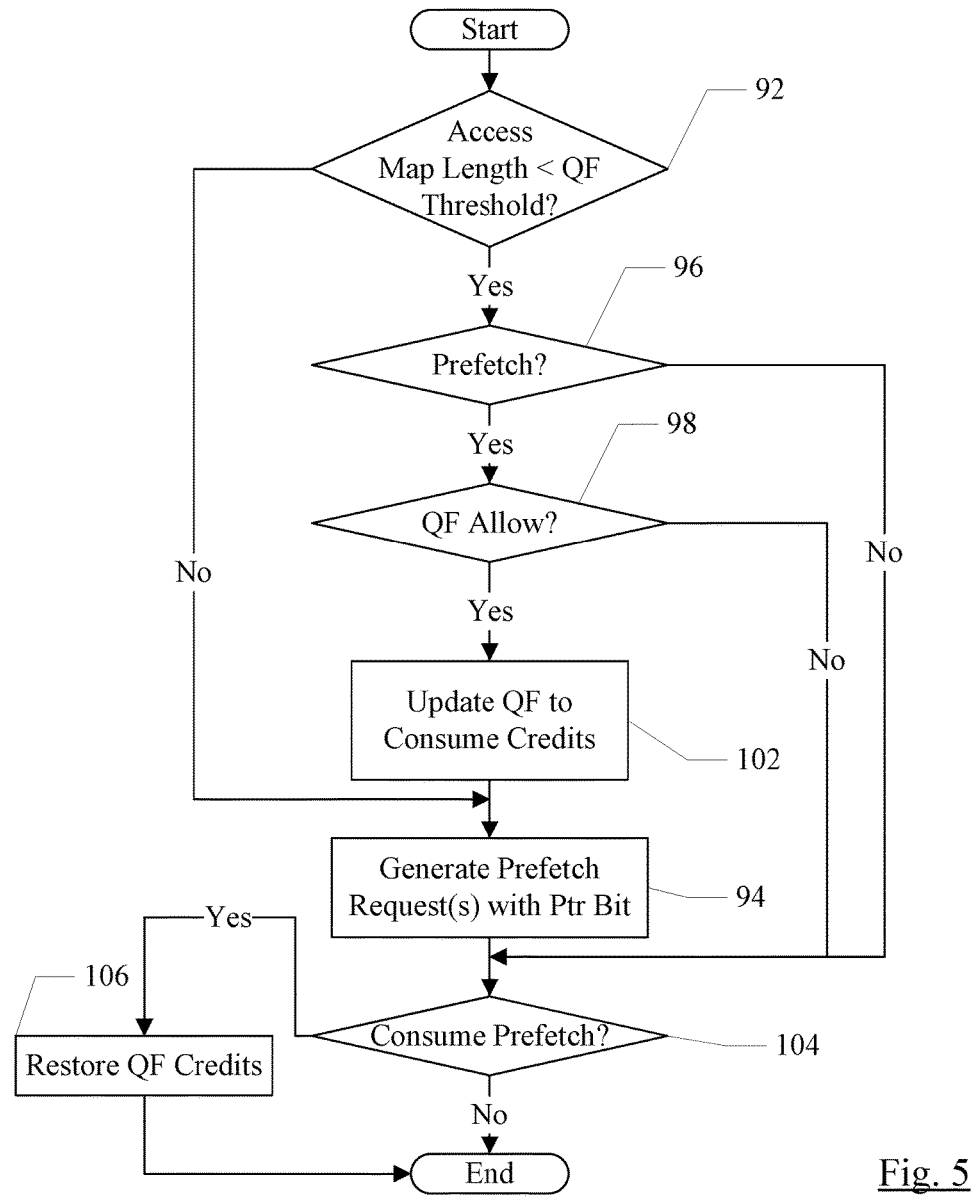
FIG. 4 is a block diagram illustrating one embodiment of a quality factor, a pointer field, and a store-only field as part of one embodiment of an access map.
FIG. 5 is a flowchart illustrating operation of one embodiment of the prefetch circuit shown in FIG. 2 for using the fields shown in FIG. 4.

In some embodiments, the state field in each access map entry may store a quality factor. Such an entry 90 is illustrated in FIG. 4, which shows the virtual address tag, the access map, a quality factor field (QF), the pointer field described above (Ptr) and the store-only field described above (St-O). Embodiments which also implement that chained entries for streams may include chained entry fields in the state field as well, not shown in FIG. 8. The quality factor may be a value that measures or estimates the effectiveness of the prefetching for the corresponding access map. The quality factor may be used to further limit or prevent prefetching (above what the pattern itself already limits) when the effectiveness is not high. Additionally, in some embodiments, the quality factor may be used to "meter" prefetching that is effective but that is being consumed slowly. That is, using the quality factor to limit the prefetching may result in prefetched data being delivered closer to the time at which the data will be consumed by demand fetches. The scheduling of memory accesses in the memory system may be more efficient in some cases, since the prefetch traffic may be less bursty and thus the congestion in the memory system may be lower.

As mentioned above, longer access patterns may tend to be more accurate in predicting prefetches, and so the quality factor may not be used if the access map length exceeds a threshold. The threshold may be fixed or programmable in the prefetch circuit, in some embodiments. Other embodiments may use the quality factor for any access map length In an embodiment, the quality factor may be a token-based or credit-based mechanism. The tokens/credits may represent an allowable amount of outstanding prefetching. Accordingly, tokens/credits may be consumed when a prefetch request is generated (and a prefetch request may only be generated if sufficient tokens/credits are available). A successful prefetch may return the tokens/credits to the quality factor value. Various other events may affect the quality factor as well.

FIG. 5 is a flowchart illustrating operation of one embodiment of the prefetch circuit 20, and more particularly the control circuit 46, in response to a pattern match in the access pattern memory 44 for an access map when quality factors are used. Other operation, e.g. as illustrated in FIG. 3 and discussed above, may also be performed. While the blocks are shown in a particular order for ease of understanding, other orders may be used. Blocks may be performed in parallel in combinatorial logic in the prefetch circuit 20/control circuit 46. Blocks, combinations of blocks, and/or the flowchart as a whole may be pipelined over multiple clock cycles. The prefetch circuit 20/control circuit 46 may be configured to implement the operation shown in FIG. 5.

If the access map length is greater than the quality factor threshold (decision block 92, "no" leg), the quality factor is not used for the access map in this embodiment. The prefetch request(s) may be generated as indicated in the access map (block 94), and the pointer bit may be set/cleared as indicated by the pointer field. As mentioned previously, other embodiments may not implement the quality factor threshold and decision block 92 may be eliminated in such embodiments. If the access map length is less than the quality factor threshold, but the indicated prefetch requests have already been generated or there are not enough credits/tokens available to generate a prefetch request (decision block 92, "yes" leg and either decision block 96, "no" leg or decision block 98, "no" leg), there is no prefetch request to be generated. If there are prefetch request(s) to be generated and there are sufficient tokens/credits (decision blocks 92, 96, and 98, "yes" legs), the control circuit 46 may be configured to update the quality factor to consume the credits/tokens for a prefetch request or requests (block 102) and may be configured to generate the indicated and permitted prefetch request(s) with the pointer bit as discussed above with regard to FIG. 3 (block 94).

Additionally, if a prefetch is consumed by a demand fetch (changing a "P" symbol to an "S" symbol in the access map—decision block 104, "yes" leg), the control circuit may be configured to update the quality factor to restore the number of credits/tokens consumed for the prefetch request (block 106).

The number of credits/tokens consumed for a prefetch request and restored for a successful prefetch may vary in various embodiments. One example embodiment is illustrated in the table 100 of FIG. 7, although numerous embodiments are possible and contemplated. In the embodiment of FIG. 7, the quality factor may be initialized to 75 credits/tokens and 100 may be the maximum tokens. A prefetch request may consume 8 tokens, unless the prefetch request is from a store-only map in which case the prefetch request may consume 10 tokens. Thus, the store-only prefetches may be more "expensive" than non-store-only prefetches, which may result in a lower frequency of prefetches from the store-only maps as compared to non-store-only maps. A successful prefetch (e.g. a prefetch consumed by a demand access) may restore 12 tokens to the quality factor. Additionally, a prefetch request that hits in the data cache 30 results in a deduction of 4 tokens in this embodiment (penalizing patterns that generate prefetches for data that is already stored in the data cache, under the assumption that additional prefetches may result in additional cache hits.

Figure 6:
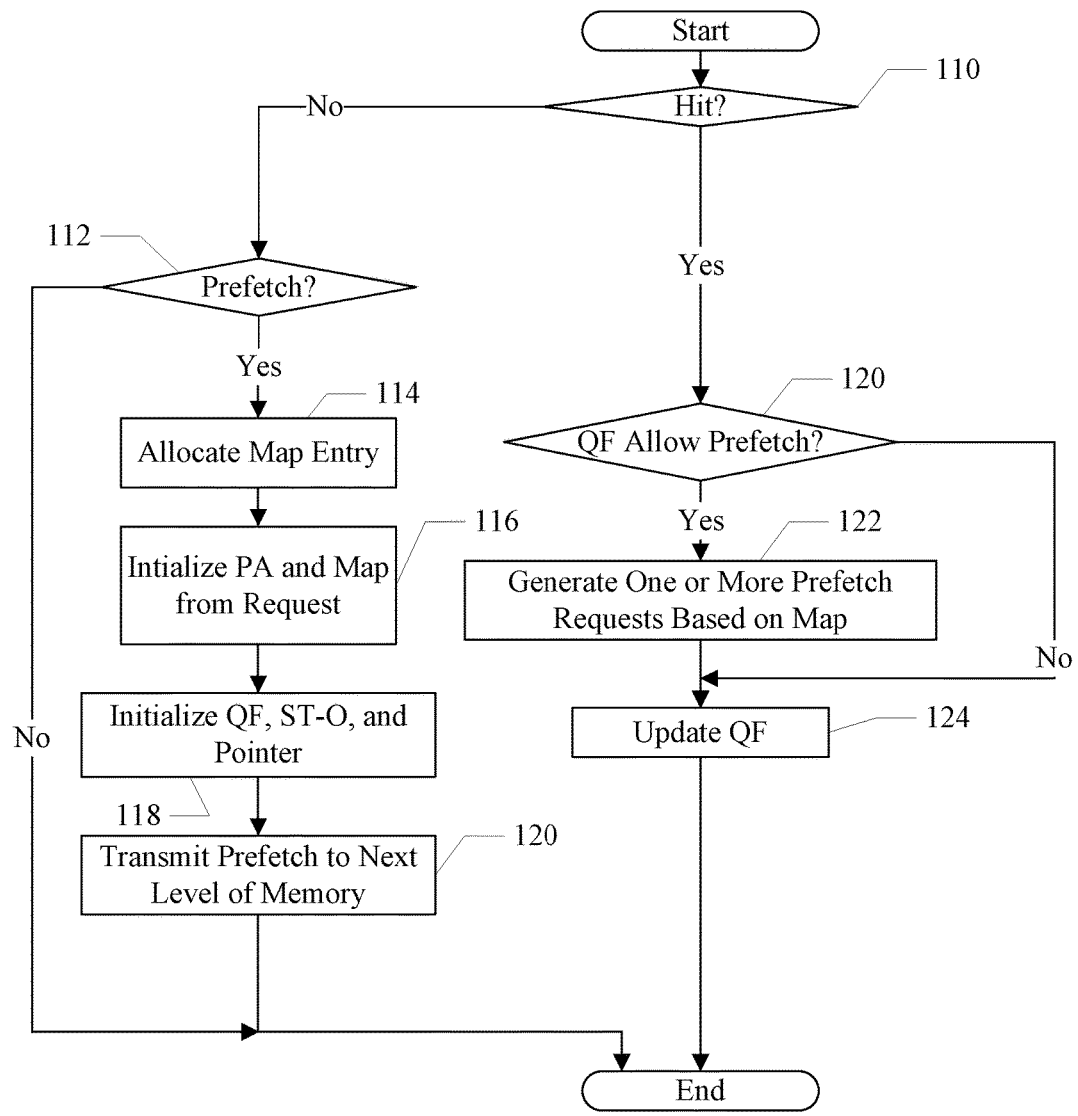
FIG. 6 is a flowchart illustrating operation of one embodiment of the prefetch circuit within the external cache shown in FIG. 1.

The prefetch circuit 36 may be similar in structure to the prefetch circuit 20 as shown in FIG. 2, except that pattern matching may not be implemented since the pattern is already determined when the prefetch requests are transmitted to the prefetch circuit 36/external cache 34. The prefetch circuit 36 may attempt to prefetch "ahead" of the prefetch circuit 20, reducing latency for prefetch requests from the prefetch circuit 20 and/or demand fetches in cases where the prefetched data is accessed from the external cache 34. FIG. 6 is a flowchart illustrating operation of one embodiment of the prefetch circuit 36. While the blocks are shown in a particular order for ease of understanding, other orders may be used. Blocks may be performed in parallel in combinatorial logic in the prefetch circuit 36. Blocks, combinations of blocks, and/or the flowchart as a whole may be pipelined over multiple clock cycles. The prefetch circuit 36 may be configured to implement the operation shown in FIG. 6.

If the operation is a miss in the access maps in the prefetch circuit 36 (decision block 110, "no" leg) and is a prefetch request (not a demand fetch) from the processor 10 (decision block 112, "yes" leg), the prefetch circuit 36 may allocate a map entry to the region affected by the prefetch (block 114). The prefetch circuit may initialize the allocated entry with the physical address (PA) and the map provided with the prefetch request (block 116), and may initialize the quality factor, store-only, and pointer fields of the entry based on the pointer indication and other data provided with the prefetch request (block 118). The prefetch circuit 36 (or the external cache 34) may transmit the prefetch request to the next level of memory (e.g. the next level cache, or the main memory, depending on the system—block 120). The external cache 34 may check the prefetch request for a hit, and may prevent transmission of the prefetch request to the next level of memory if the prefetch request is a hit in the external cache 34.

If the operation is a hit in the prefetch circuit 36 (decision block 110, "yes" leg), and the quality factor in then entry includes enough credits for one or more prefetch requests (decision block 120, "yes" leg), the prefetch circuit 36 may be configured to generate the one or more prefetch requests based on the access map in the hitting entry (block 122). The prefetch circuit 36 may also be configured to update the quality factor in the entry based on the hitting request and/or the generated prefetch requests (block 124).

FIG. 8 is a table 108 illustrating exemplary quality factor tokens for various events in the prefetch circuit 36 for one embodiment. In the embodiment of FIG. 8, the quality factor may be initialized to 32 credits/tokens and 100 may be the maximum tokens. A prefetch request may consume 4 tokens, unless the prefetch request is from a store-only map in which case the prefetch request may consume 6 tokens. A successful prefetch (e.g. a prefetch consumed by a demand access) may restore 8 tokens to the quality factor. Additionally, a prefetch request having a set pointer indication (indicating pointer read activity) may return 12 credits to the quality factor, permitting more prefetch requests when pointer activity is detected. That is, the frequency of prefetch requests from an access map for which pointer reads are detected may be higher than the frequency of prefetch requests from an access map for which pointer reads are not detected.

FIG. 9 illustrates various examples of access patterns that may be represented in the access pattern memory 44 according to one embodiment of the prefetch circuit. The access point (AP) is illustrated with a heading of AP and two vertical lines separating the symbol at the access point from the other symbols. The access patterns may use the same set of symbols that are used in access maps, including the ".", P, A, and S symbols (although no S symbols are used in the examples of FIG. 9).

The first pattern shown is a simple unit stride pattern as may be detected by a stride based prefetcher. In this case, the pattern is forward and thus the A symbols are on the left and the P symbols are on the right. To match this pattern, the three A symbols would need to be matched to the access map. If a match on this pattern is detected, the control circuit 46 may be configured to generate two prefetch requests, one at the access point plus one cache line and one at the access point plus two cache lines. If the access map already included one P, the other prefetch request may be generated. If both Ps were already in the access map, no additional prefetch requests may be generated.

The second pattern shown is a non-unit stride, but still a regular stride, in the forward direction. In this example, the stride is two. If a match on this pattern is detected (by matching the three As and the intervening "." symbols as well), the control circuit 46 may be configured to generate two prefetch requests, one at the access point plus two cache lines and one at the access point plus four cache lines. Like the first pattern, if a given P is already in the access map, the other prefetch request may be generated and no prefetch requests may be generated if both Ps are already in the access map.

The third pattern show is a unit stride pattern in the backward direction, again two prefetches would be generated if the pattern is matched by the three As, two prefetch requests would be generated (one at the access point minus one cache line, the other at the access point minus two cache lines). Like the first pattern, if a given P is already in the access map, the other prefetch request may be generated and no prefetch requests may be generated if both Ps are already in the access map.

The first three patterns in FIG. 9 illustrate patterns that a stride-based prefetcher may be able to detect. However, the control over the number of prefetches that are generated may be more precise using the patterns. In an embodiment, if there are N matching As and/or Ss in a pattern, there may be N−1 Ps in the pattern. Thus, as the pattern length is longer, the confidence in the pattern to generate accurate prefetches may increase.

In addition, a wildcard symbol may be included in the patterns. For example, the fourth pattern shown may include three wildcard symbols, illustrated as "*" in FIG. 9 (e.g. at reference number 148). The wildcard pattern may match any symbol in an access map. The wildcard patterns may increase the flexibility of the access patterns, in an embodiment. For example, in an out-of-order processor, the demand accesses may occur in a variety of orders based on operand availability, execution resource availability, and other dynamic factors. The varying order of accesses creates noise near the access point, referred to by the inventors as the "noisy wave front." Without wildcards, accurately matching such access maps to access patterns may be more complicated. Multiple access patterns might have to be included, to capture all the possible orders, for example, limiting the number of unrelated access patterns that may be included in a given size of memory.

Another case in which wildcard symbols in access patterns may be useful is to capture access maps in which unusual orders of accesses are performed by the code (even if executed approximately in order), even though the final access patterns may be regular (e.g. all the cache blocks in a range of the access map may be touched, or a predictable group may be touched). Wildcard symbols may be used for the unusual ordered accesses in such cases.

In one embodiment, access patterns that include wildcards may include fewer Ps, since the confidence in the accuracy of the pattern match may not be as high. For example, only the actual As in the access pattern may be counted in determining how many Ps to include. Alternatively, the wildcard symbols may be counted at a discounted weight (e.g. ½, ⅓, etc.).

As mentioned, a wildcard symbol may match any symbol at the same point in an access map. Accordingly, multiple access maps may match a pattern that includes a wildcard symbol. FIG. 10 is an example of an access pattern with one wildcard symbol, and the four access maps which would match that access pattern.

Another type of pattern that may be used is an irregular pattern. The last two patterns illustrated in FIG. 9 are examples of irregular patterns. Generally, an irregular pattern may be any access pattern which is predictable, but is not accurately described with a stride. That is, the actual cache blocks accessed by the instruction code being executed are irregularly spaced, but are still predictable. Access maps with irregular patterns may be detectable in the pattern memory 44, and may be accurately predicted for prefetches. Wildcard patterns may also be used to aid in detecting irregular patterns as well, as mentioned above.

System

Figure 11:
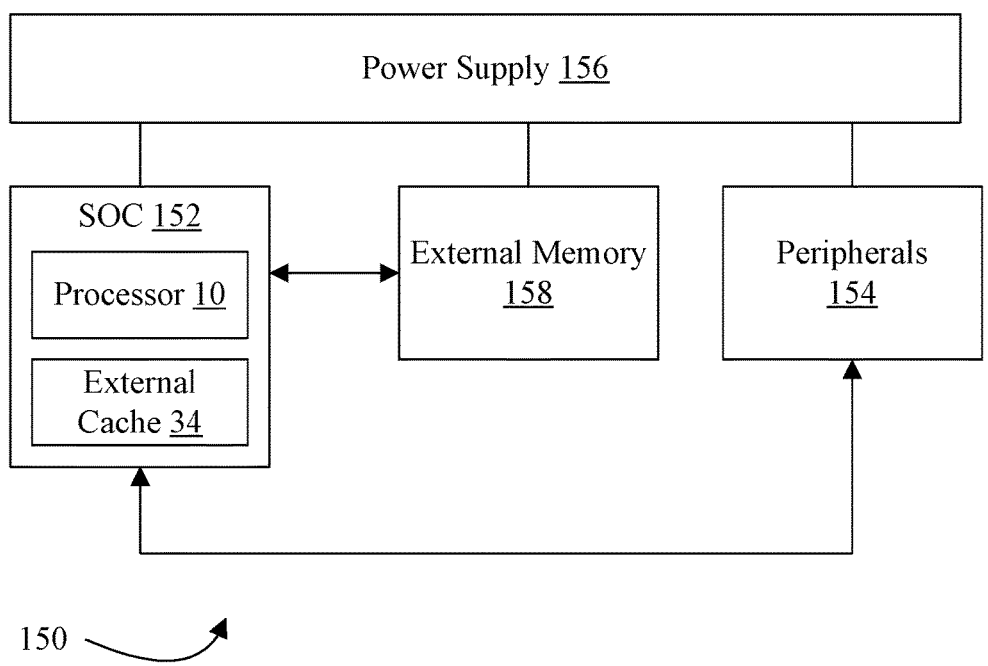
FIG. 11 is a block diagram illustrating one embodiment of a system.

Turning next to FIG. 11, a block diagram of one embodiment of a system 150 is shown. In the illustrated embodiment, the system 150 includes at least one instance of an system on a chip (SOC) 152 coupled to one or more peripherals 154 and an external memory 158. A power supply 156 is provided which supplies the supply voltages to the SOC 152 as well as one or more supply voltages to the memory 158 and/or the peripherals 154. In some embodiments, more than one instance of the SOC 152 may be included (and more than one memory 158 may be included as well). The SOC 152 may include one or more instances of the processor 10 and/or the external cache 34 as illustrated in FIG. 1.

The peripherals 154 may include any desired circuitry, depending on the type of system 150. For example, in one embodiment, the system 150 may be a mobile device (e.g. personal digital assistant (PDA), smart phone, etc.) and the peripherals 154 may include devices for various types of wireless communication, such as wifi, Bluetooth, cellular, global positioning system, etc. The peripherals 154 may also include additional storage, including RAM storage, solid state storage, or disk storage. The peripherals 154 may include user interface devices such as a display screen, including touch display screens or multitouch display screens, keyboard or other input devices, microphones, speakers, etc. In other embodiments, the system 150 may be any type of computing system (e.g. desktop personal computer, laptop, workstation, net top etc.).

The external memory 158 may include any type of memory. For example, the external memory 158 may be SRAM, dynamic RAM (DRAM) such as synchronous DRAM (SDRAM), double data rate (DDR, DDR2, DDR3, etc.) SDRAM, RAMBUS DRAM, low power versions of the DDR DRAM (e.g. LPDDR, mDDR, etc.), etc. The external memory 158 may include one or more memory modules to which the memory devices are mounted, such as single inline memory modules (SIMMs), dual inline memory modules (DIMMs), etc. Alternatively, the external memory 158 may include one or more memory devices that are mounted on the SOC 152 in a chip-on-chip or package-on-package implementation.

Numerous variations and modifications will become apparent to those skilled in the art once the above disclosure is fully appreciated. It is intended that the following claims be interpreted to embrace all such variations and modifications.

What is claimed is:

1. A processor including:
    a cache; and
    a prefetch circuit coupled to the cache and configured to:
        track accesses to the cache in a plurality of access maps, each access map covering a different area of memory;
        maintain a store-only field associated with each of the plurality of access maps, wherein the store-only field indicates whether or not only store memory operations have been observed in a corresponding access map;
issue prefetch requests for the corresponding access map at a frequency that depends on the store-only field, wherein each prefetch request identifies a respective cache block to be prefetched into the cache.

2. The processor as recited in claim 1 wherein the frequency is lower if the store-only field indicates that only store memory operations have been observed than if the store-only field does not indicate that only store memory operations have been observed.

3. The processor as recited in claim 1 wherein the prefetch circuit is configured to initialize a first access map of the plurality of access maps responsive to a memory operation accessing the cache at an address that is not included in the memory areas covered by the plurality access maps, and wherein the prefetch circuit is configured to initialize the store-only field of the first access map to indicate store-only if the memory operation is a store memory operation.

4. The processor as recited in claim 3 wherein the prefetch circuit is configured to initialize the store-only field of the first access to indicate not store-only if the memory operation is a load memory operation.

5. The processor as recited in claim 4 wherein the store-only field remains in a state indicating not store-only until the first access map is invalidated.

6. The processor as recited in claim 3 wherein the prefetch circuit is configured to detect a load memory operation to the memory area covered by the first access map, and wherein the prefetch circuit is configured to modify the store-only field of the first access map to indicate not store-only in response to the load memory operation.

7. The processor as recited in claim 6 wherein the store-only field remains in a state indicating not store-only until the first access map is invalidated.

8. The processor as recited in claim 1 wherein the prefetch circuit is configured to:
maintain a quality factor with respect to each of the plurality of access maps; and
decrease the quality factor responsive to generating the prefetch request, wherein the decrease is a larger amount responsive to the store-only field indicating only store memory operations have been observed than if the store-only field does not indicate that only store memory operations have been observed.

9. A processor including:
a cache; and
a prefetch circuit coupled to the cache and configured to:
track accesses to the cache in a plurality of access maps, each access map covering a different area of memory;
maintain a store-only field associated with each of the plurality of access maps, wherein the store-only field indicates whether or not only store memory operations have been observed in a corresponding access map;
issue prefetch requests for the corresponding access map, wherein the prefetch circuit issues prefetch requests less aggressively for the corresponding access map responsive to the store-only field indicating that only store memory operations have been observed in the corresponding access map than the prefetch circuit issues prefetch requests for a different access map for which the store-only field indicates that at least one load memory operation has been observed.

10. The processor as recited in claim 9 wherein the prefetch circuit is configured to initialize a first access map of the plurality of access maps responsive to a memory operation accessing the cache at an address that is not included in the memory areas covered by the plurality access maps, and wherein the prefetch circuit is configured to initialize the store-only field of the first access map to indicate store-only if the memory operation is a store memory operation.

11. The processor as recited in claim 10 wherein the prefetch circuit is configured to initialize the store-only field of the first access to indicate that at least one load memory operation has been observed if the memory operation is a load memory operation.

12. The processor as recited in claim 11 wherein the store-only field remains in a state indicating that at least one load memory operation has been observed until the first access map is invalidated.

13. The processor as recited in claim 10 wherein the prefetch circuit is configured to detect a load memory operation to the memory area covered by the first access map, and wherein the prefetch circuit is configured to modify the store-only field of the first access map to indicate that at least one load memory operation has been observed in response to the load memory operation.

14. The processor as recited in claim 13 wherein the store-only field remains in a state indicating that at least one load memory operation has been observed until the first access map is invalidated.

15. The processor as recited in claim 9 wherein the prefetch circuit is configured to:
maintain a quality factor with respect to each of the plurality of access maps; and
decrease the quality factor responsive to generating the prefetch request, wherein the decrease is a larger amount responsive to the store-only field indicating only store memory operations have been observed than if the store-only field indicates that that at least one load memory operation has been observed.

16. A system comprising:
a processor including:
a first cache;
a first prefetch circuit coupled to the first cache and configured to:
track accesses to the first cache in a plurality of access maps, each access map covering a different area of memory;
maintain a store-only field associated with each of the plurality of access maps, wherein the store-only field indicates whether or not only store memory operations have been observed in a corresponding access map;
issue first prefetch requests for the corresponding access map at a first frequency that depends on the store-only field, wherein each first prefetch request identifies a respective first cache block to be prefetched into the first cache;
a second cache coupled to the processor; and
a second prefetch circuit coupled to the second cache and the processor, wherein the second prefetch circuit is configured to:
generate second prefetch requests for the second cache responsive to first prefetch requests from the processor; and issue the second prefetch requests at a second frequency that depends on the store-only field, wherein each second prefetch request identifies a respective second cache block to be prefetched into the second cache.

17. The system as recited in claim 16 wherein the first frequency and the second frequency are lower if the store-only field indicates that only store memory operations have been observed than if the store-only field does not indicate that only store memory operations have been observed.

18. The system as recited in claim 16 wherein the first prefetch circuit is configured to initialize a first access map of the plurality of access maps responsive to a memory operation accessing the first cache at an address that is not included in the memory areas covered by the plurality access maps, and wherein the first prefetch circuit is configured to initialize the store-only field of the first access map to indicate store-only if the memory operation is a store memory operation.

19. The system as recited in claim 18 wherein the first prefetch circuit is configured to initialize the store-only field of the first access to indicate not store-only if the memory operation is a load memory operation.

20. The system as recited in claim 18 wherein the first prefetch circuit is configured to detect a load memory operation to the memory area covered by the first access map, and wherein the first prefetch circuit is configured to modify the store-only field of the first access map to indicate not store-only in response to the load memory operation.

* * * * *